March 31, 1931.  W. N. MISCHLER  1,799,019
CLAMPING DEVICE
Filed April 15, 1929
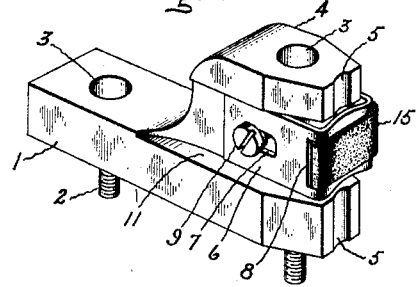
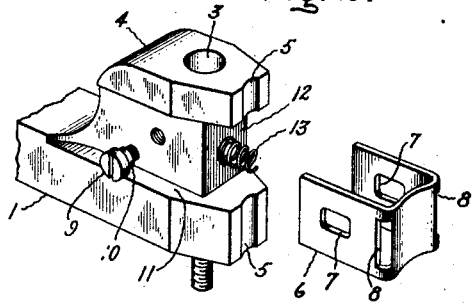
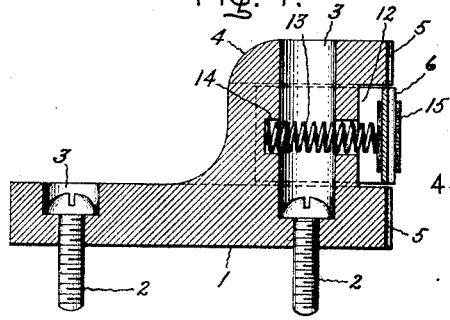
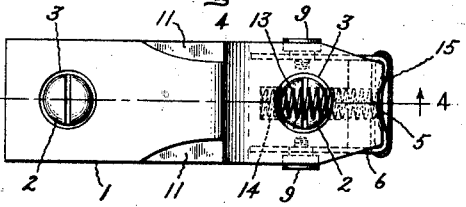
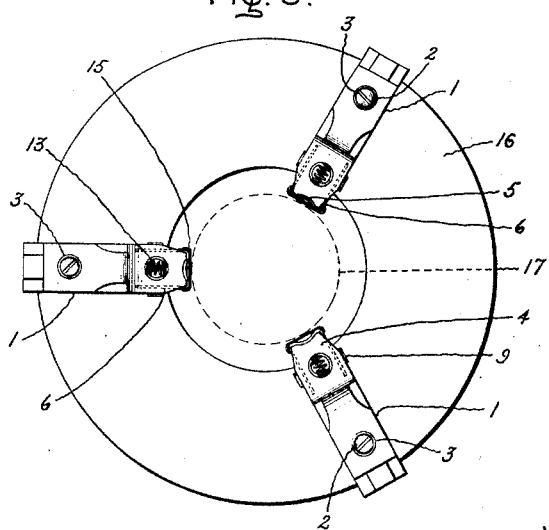
Inventor:
William N. Mischler,
by Charles E. Tullar
His Attorney.

Patented Mar. 31, 1931

1,799,019

UNITED STATES PATENT OFFICE

WILLIAM N. MISCHLER, OF SCOTIA, NEW YORK, ASSIGNOR TO GENERAL ELECTRIC COMPANY, A CORPORATION OF NEW YORK

CLAMPING DEVICE

Application filed April 15, 1929. Serial No. 355,191.

The present invention relates to clamping devices and more particularly to chucks for holding glass or other material of a hard, brittle nature while being fashioned into the various shapes suitable for tube structure. In the fabrication and shaping of glass envelopes designed to enclose electrodes for electric discharge purposes, it is usually necessary to provide means for holding the envelope, at the same time allowing the holding means to rotate as in a lathe. The prior art type of chuck used in cases of this sort is similar to that ordinarily found in the machine shop, the chuck constituting three or more jaws movable in unison along equidistantly spaced axes which radiate from a common center and each terminating in a corrugated gripping surface. It has been noted however that when the body to be clamped comprises a hard and brittle substance such as glass, formed as a tube having a relatively thin shell, a chuck of this kind tends to shatter the glass before a sufficient clamping pressure can be applied. On the other hand when the pressure is kept below the shattering point the tube tends to move in a revolving chuck and the resulting slippage may introduce danger to the operator or at least may cause nonuniformity of tube product. In order resiliently to secure the tube in the chuck, it has been proposed heretofore to use felt, cotton waste or similar material between the contacting surfaces but this practice is not altogether satisfactory because of the difficulties attending the insertion of the material while at the same time operating the mechanism which controls the movement of the jaws. Moreover, there is always attendant the nuisance of providing pieces of such material which must be of substantially the same thickness and resiliency.

An object of the present invention is to provide a chuck jaw with an improved clamping accessory having a frictional surface of uniform resiliency so that a hollow glass body may be secured without undue pressure and be assured of proper centering. This object is attained in brief by fitting to each of the jaws of the ordinary type of chuck a spring mounted attachment which carries a replaceable friction member. Other objects and features will be apparent as the specification is perused in connection with the accompanying drawing in which Figure 1 shows an assembly view in perspective of the improved chuck jaw; Figure 2 is an exploded view in perspective of a jaw portion and the various component parts of the clamping accessory; Figure 3 is a top plan view of the assembled jaw; Figure 4 is a cross section of the jaw taken along line 4—4 of Figure 3, while Figure 5 shows in elevation a chuck head with the improved jaws in place.

Referring to the drawing, numeral 1 designates the main body of a chuck jaw provided with screws 2 which secure the body to the usual radially movable members (not shown) of the chuck head. The screws conveniently are set in counterbored holes 3 as shown in Figure 4. In the exemplary type of jaw illustrated, member 1 terminates in an enlargement 4 which contains a vertical groove 5 conforming to a curve of relatively small radius and extending the entire depth of the jaw. In accordance with my invention the clamping attachment may consist of a metallic U-shaped strip member 6 sufficiently thin to retain a limited degree of pliability and yet of resilient construction. The strip member is provided with two pairs of oppositely disposed slots, one pair 7 being located in the side portions of the member and of elongated dimension, as shown in Figure 2, and the other pair 8 preferably located at each of the corners and are of elongate dimension in a direction normal to the long dimension of the other slot pair. The latter serve slidably to position the member 6 on the chuck jaw by means of screws 9, having a shoulder 10 upon which the member 6 rides. The strip member may rest upon a ledge 11 formed as a horizontal slot in both sides of the enlargement 4. The front face or contacting surface of the enlargement is also cut away to form a slot 12 to receive the strip member when the latter is forced back by the chucked body. When being assembled, a compression spring 13 is inserted between the member 6 an the chuck jaw, the spring being held in place by means of a hole 14 which extends a considerable distance into the jaw enlargement 4 as shown most clearly in Figure 4. While various forms of friction surface will suggest themselves to those skilled in the art, I prefer to employ a woven asbestos friction tape so-called of a width somewhat less than the length of the slot 8 and constituting one or more layers or turns as a continuous band 15 which is sewed together and threaded through the pair of slots 8 before the member is affixed on the chuck jaw. While forming the band of tape, it is preferable to maintain tension on the free end of the material so that the surface in contact with the body in the chuck will present a yielding but nevertheless a retaining hold on such body. In order to enhance the resilient response of the tape to the force exercised at the place of the contact, it may be desirable to hollow out the face portion of the strip 6, i. e., to provide a space between this portion and the line of the tape which can be done most conveniently by simply bending the member 6 to conform to a curve in the manner shown. It will be evident that when the improved jaws are affixed on the chuck head 16 of a conventional construction as illustrated for example in Figure 5, a cylindrical glass tube 17, represented roughly by the dotted line may be effectively chucked due to the yielding pressure exerted by the compression spring 13 and also by the tape.

In placing a glass cylinder between the jaws preparatory to the performing of an operation on the tube, it is preferable to place one hand on the tube to check for the instant that no movement of the glass body can be detected and to tighten the chuck by a mechanism of well known construction (not shown) with the other hand. It is found that when the absence of movement occurs, the tube is held securely by the friction tape notwithstanding the relatively small compression employed and hence without the slightest danger of causing the tube to collapse or shatter. It is apparent that as a pressure is applied against the tape 15 by the chucked body, the strip member recedes into the slot 12 against the compressional stress exerted by the spring 13, allowing the edges of the vertical groove 5 to center the body in the usual manner.

What I claim as new and desire to secure by Letters Patent of the United States, is:

1. In combination with a chuck jaw, an attachment for providing a yieldable friction surface, said attachment comprising a strip which is yieldably mounted on the jaw and carries a layer of friction material, said strip being concave with respect to the layer of frictional material so as to allow transverse movement of the latter when the jaw is tightened on a chucked body.

2. In combination with a chuck jaw, an attachment for providing a yieldable friction surface, said attachment comprising a metallic strip slidably mounted on the jaw, a compression spring located between the strip and the jaw and a band of resilient material affixed to the contact face of the strip, the axis of said spring being in the same plane as the direction of force exerted by the jaw on a chucked body.

3. In combination with a chuck jaw, an attachment for providing a yieldable friction surface, said attachment comprising a metallic strip resiliently mounted on the jaw and having a plurality of spaced openings adapted to receive one or more turns of friction tape.

4. In combination with a chuck jaw, an attachment for presenting a yieldable friction surface, to a chucked body, said attachment comprising a metallic strip resiliently mounted on the jaw and supporting a layer of friction tape, said strip having a plurality of spaced openings adapted to receive one or more turns of said friction tape, said strip being concave with respect to the line of the tape thereby to allow transverse movement of the latter in response to the force of compression exercised by the jaw on the said body.

5. In combination with a chuck jaw, an attachment for providing yieldable friction surface, said attachment comprising a metallic strip slidably mounted on the jaw and provided with a concave contact face, a compression spring located between the strip and the jaw and a band of resilient material stretched tightly across the contact face of the strip.

In witness whereof, I have hereunto set my hand this 13th day of April, 1929.

WILLIAM N. MISCHLER.